G. A. DARDEN.
DRAFT ATTACHMENT FOR CARRIAGES AND WAGONS.
APPLICATION FILED OCT. 18, 1910.
1,011,037.
Patented Dec. 5, 1911.
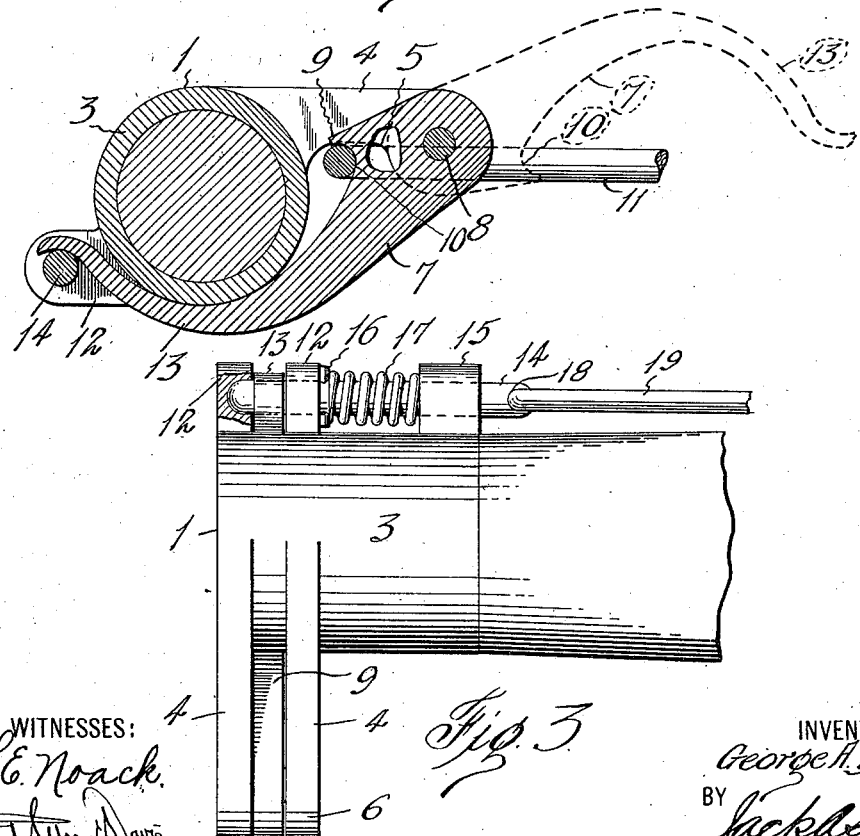

UNITED STATES PATENT OFFICE.

GEORGE A. DARDEN, OF DALLAS, TEXAS.

DRAFT ATTACHMENT FOR CARRIAGES AND WAGONS.

1,011,037.  Specification of Letters Patent.  Patented Dec. 5, 1911.

Application filed October 18, 1910. Serial No. 587,684.

*To all whom it may concern:*

Be it known that I, GEORGE A. DARDEN, citizen of the United States, residing at Dallas, in the county of Dallas and State of Texas, have invented certain new and useful Improvements in Draft Attachments for Carriages and Wagons, of which the following is a specification.

This invention relates to new and useful improvements in draft attachments for carriages and wagons.

The object of the invention is to provide a device which may be secured to a swingletree or a vehicle axle whereby the traces or shafts may be readily secured in position or instantly released.

A further object resides in the provision of a lever pivoted only a sufficient distance out of the line of draft as to permit the lever to be swung forward when its latch is released and thus reducing the pressure on the latch whereby the same may be operated with comparative ease.

Finally the object of the invention is to provide means of the character described that will be strong, durable, efficient, and easy of operation, simple and comparatively inexpensive to construct, and also in which the several parts will not be likely to get out of working order.

With the above and other objects in view, the invention has relation to certain novel features of construction and operation, an example of which is described in this specification and illustrated in the accompanying drawings, wherein:

Figure 1. is a plan view of a swingletree equipped with the attachment, Fig. 2. is a vertical sectional view, and Fig. 3. is a detail in plan.

In the drawings the numeral 1 designates a supporting member which has a collar 3. This collar may be fitted on the end of a swingletree or about an axle. Projecting from the upper portion and near one end of the collar are a pair of spaced lugs 4. The upper edges of the lugs are tangential to the collar while the under portions are cut out as indicated at 5.

With reference to Fig. 2 it will be noted that the lugs are disposed entirely above the horizontal center of the collar and each has a rounded boss 6 at its end, the cutaway portion 5 of each lug extending from the boss to the collar. Between the lugs a draft lever 7 is mounted on a pivot pin 8 fixed in the bosses. This lever has a rounded end conforming to the general contour of the bosses. An overhanging lip 9 is provided on the lever with a notch 10 thereunder.

The lip and notch are adjacent the cutaway portions 5 when the lever is in its normal position. A link or similar element 11 when placed under draft will occupy substantially the position shown in Fig. 2; that is it will engage in the notch 10 under the lip 9 and thus be held in the cutaway portions 5 of the lugs. It will be noted that the top line of the link passes almost through the center of the pivot pin 8 and the draft is exerted almost in line with and against the pivot pin. The lever notch 10 is some distance from the bosses 6 and the cutaway portions 5 are elongated so that said notch may wear deeper and the link 11 will still be held out of contact with the bosses 6.

From the lower side of the collar and opposite to the lugs 4 a pair of spaced ears 12 project. The lower edges of the ears are tangential to the collar and parallel to the upper edges of the lugs and the ears stand in the same vertical planes as the lugs. The lever 7 has a curved handle portion 13 which swings under the collar and terminates between the ears. A transverse plunger 14 supported in a boss 15 passes through one of the ears and engages in the other. Over this plunger the handle 13 engages. Adjacent the innermost ear, a pin 16 is passed transversely through the plunger and abuts the ear to limit the forward or latching movement of the plunger. A coil spring 17 surrounds the plunger between the pin and the boss 15 and serves to force the plunger into the ears. The plunger has in its end adjacent the boss 15, an eye 18 in which a flexible connection 19 may be engaged.

With the parts in the position as shown in full lines in Fig. 2, the draft is almost in line with the pivot pin 8 and there is comparatively little pressure exerted on the latch plunger by the handle 13. However the center of draft is sufficiently below the center of the pivot pin to cause the lever to swing forward to the position shown in dotted lines, when the plunger is withdrawn.

Of course when the lever is swung forward the link 11 is released. It will be readily understood that where the draft animal is "bogged" or exerting a great strain on the link 11, it would be extremely difficult to release the lever if very much pressure was delivered on the plunger or other fastening by the handle of the lever. With the arrangement herein shown the lever may be instantly released under almost any pressure.

In Fig. 1 a swingletree 20 is shown with an attachment at each end and the plungers connected by the connection 19. By grasping the connection at the center and pulling thereon the plungers are withdrawn and the levers permitted to swing forward, thus releasing the rings 21 of the traces. It is to be understood that the part 11 may either represent the ring of a trace or the thill of a vehicle shaft. In connecting the attachment to the swingletree of a buggy it would have to be inverted so that the hook would be on top.

What I claim is:

In a horse detaching device, a rigid collar, a pair of spaced lugs directed outwardly from the side of the periphery of the collar, ears directed outwardly from the opposite side of the periphery of the collar and in the opposite direction to the lugs, said ears being in a lower plane than the lugs, a lever mounted between the lugs and having a link receiving notch normally located below the said lugs, a spring latch disposed longitudinally of the collar and extending in the ears transversely thereof, and a handle extending from the lever under the collar and engaging over the latch between the ears.

In testimony whereof I have signed my name to this specification in the presence of two subscribing witnesses.

GEORGE A. DARDEN.

Witnesses:
JACK A. SCHLEY,
L. E. NOACK.

---

Copies of this patent may be obtained for five cents each, by addressing the "Commissioner of Patents, Washington, D. C."